United States Patent
Ho et al.

(10) Patent No.: US 8,020,259 B2
(45) Date of Patent: Sep. 20, 2011

(54) CABLE CLAMP AND CABLE CLAMP ASSEMBLY

(75) Inventors: Lien-Hsun Ho, Taipei (TW); Shou-Ting Yeh, Taipei (TW); Hsiung-Kuei Cheng, Taipei (TW); Pei-Lun Chiang, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 772 days.

(21) Appl. No.: 12/156,520

(22) Filed: Jun. 2, 2008

(65) Prior Publication Data

US 2009/0293233 A1  Dec. 3, 2009

(51) Int. Cl.
*F16L 3/22* (2006.01)
*F16L 11/22* (2006.01)

(52) U.S. Cl. ............... 24/129 R; 248/68.1; 248/74.4; 24/910; 24/570; 24/339

(58) Field of Classification Search ............ 24/129 R, 24/136 R, 130, 335, 336, 339, 910, 570; 248/68.1, 248/74.4
See application file for complete search history.

(56) References Cited

U.S. PATENT DOCUMENTS

| | | | | |
|---|---|---|---|---|
| 2,577,120 A | * | 12/1951 | Franz | 211/85.18 |
| 4,099,626 A | * | 7/1978 | Magnussen, Jr. | 211/60.1 |
| 4,306,697 A | * | 12/1981 | Mathews | 248/68.1 |
| 4,804,020 A | * | 2/1989 | Bartholomew | 138/111 |
| 5,316,246 A | * | 5/1994 | Scott et al. | 248/68.1 |
| 5,703,330 A | * | 12/1997 | Kujawski | 174/72 A |
| 6,061,880 A | * | 5/2000 | Senninger | 24/339 |
| 6,109,569 A | * | 8/2000 | Sakaida | 248/75 |
| D597,403 S | * | 8/2009 | Ho et al. | D8/396 |

* cited by examiner

*Primary Examiner* — Robert Sandy

(74) *Attorney, Agent, or Firm* — William E. Pelton, Esq.; Cooper & Dunham LLP

(57) ABSTRACT

A cable clamp has a body, at least one front binding hole, at least one rear binding hole, multiple front connecting elements, multiple rear connecting elements, a first lateral connecting element and a second lateral connecting element. The front and the rear connecting elements are formed on the body, and the rear connecting elements correspond respectively to the front connecting elements. The first lateral and the second lateral connecting elements are formed on the body, and the second lateral connecting element corresponds to the first lateral connecting element. Each cable clamp is capable of attaching to another cable clamp rather with connecting the front connecting element of the cable clamp to the rear connecting element of another cable clamp or with connecting the second lateral connecting element of the cable clamp to the first lateral connecting element of another cable clamp.

8 Claims, 12 Drawing Sheets

CABLE CLAMP AND CABLE CLAMP ASSEMBLY

BACKGROUND OF THE INVENTION

1. Field of the Invention

The present invention relates to a cable clamp and a cable clamp assembly, and more particularly to a cable clamp that is capable of attaching to another cable clamp to be a cable clamp assembly.

2. Description of Related Art

Electronic devices, such as speakers, video players, power supplies or the like, have signals cables or power cables. When the electronic devices are disposed together near a power socket, the cables of the electronic devices are always intertwisted with each other. When a user wants to replace one of the intertwisted cables, the user has to spend more time on disentangling the intertwisted cables.

A conventional cable clamp is invented to prevent the cables from being intertwisted together. The conventional cable clamp is ring-shaped and has a through hole to allow cables passing through the through hole to bundle the cables. Each conventional cable clamp is capable of bundling a fixed number of the cables, so multiple conventional cable clamps are required when bundling a large number of cables. However, the conventional cable clamp is an individual element and does not attach to another cable clamp, so the multiple bundles of cables are still easily intertwisted with each other.

To overcome the shortcomings, the present invention provides a cable clamp that is capable of attaching to another cable clamp to be a cable clamp assembly to mitigate or obviate the aforementioned problems.

SUMMARY OF THE INVENTION

The main objective of the invention is to provide a cable clamp that is capable of attaching to another cable clamp to be a cable clamp assembly.

The cable clamp in accordance with the present invention comprises a body, at least one front binding hole, at least one rear binding hole, multiple front connecting elements, multiple rear connecting elements, a first lateral connecting element and a second lateral connecting element. The front and the rear connecting elements are formed on the body, and the rear connecting elements correspond respectively to the front connecting elements. The first lateral and the second lateral connecting elements are formed on the body, and the second lateral connecting element corresponds to the first lateral connecting element. Each cable clamp is capable of attaching to another cable clamp rather with connecting the front connecting element of the cable clamp to the rear connecting element of another cable clamp or with connecting the second lateral connecting element of the cable clamp to the first lateral connecting element of another cable clamp.

Another objective of the invention is to provide a cable clamp assembly that comprises a first cable clamp and a second cable clamp. The first cable clamp is semicircular and has at least one inner binding hole, multiple outer binding holes and multiple first connecting elements. Each inner binding hole penetrates the first cable clamp to allow at least one cable entering the inner binding hole. Each outer binding hole penetrates the first cable clamp to allow at least one cable entering the outer binding hole. The first connecting elements are formed on an inner surface of the first cable clamp. The second cable clamp is semicircular and has at least one inner binding hole, multiple outer binding holes and multiple second connecting elements. Each inner binding hole penetrates the second cable clamp to allow at least one cable entering the inner binding hole. Each outer binding hole penetrates the second cable clamp to allow at least one cable entering the outer binding hole. The second connecting elements are formed on an inner surface of the second cable clamp, corresponds and detachably connects respectively to the first connecting elements on the first cable clamp.

Other objectives, advantages and novel features of the invention will become more apparent from the following detailed description when taken in conjunction with the accompanying drawings.

DETAILED DESCRIPTION OF PREFERRED EMBODIMENT

Figure 1:
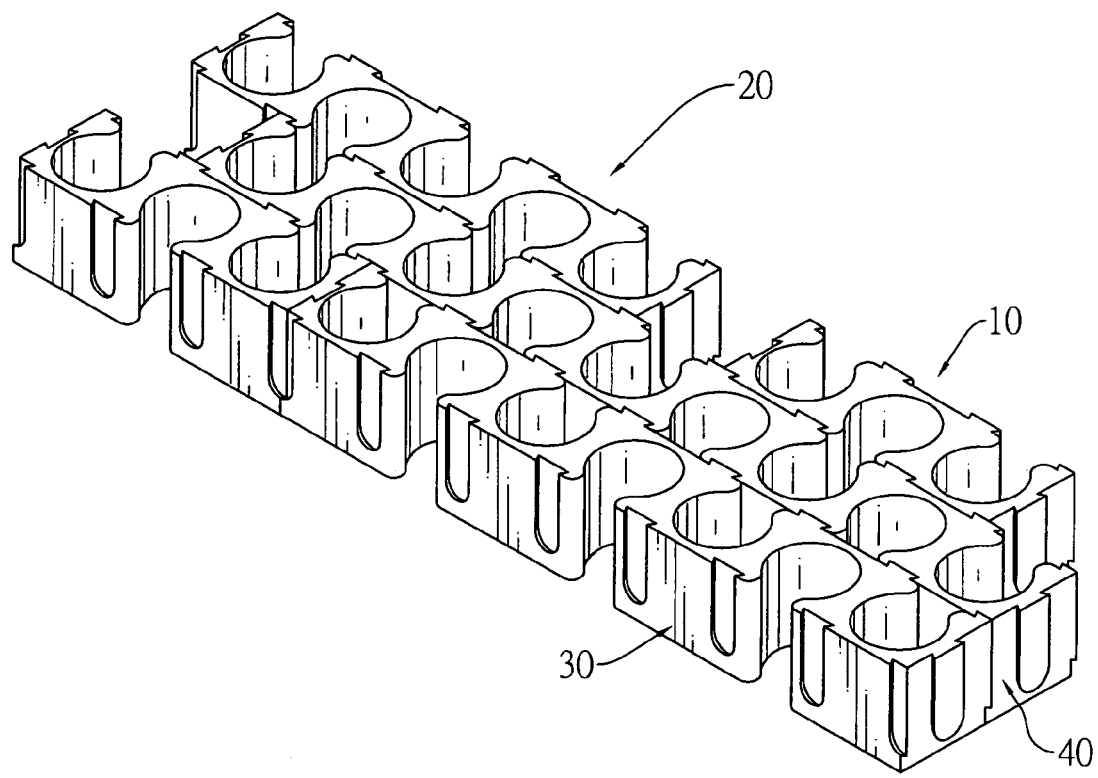
FIG. 1 is a perspective view of a first embodiment of a cable clamp assembly assembled by multiple cable clamps in accordance with the present invention.
Figure 2A:
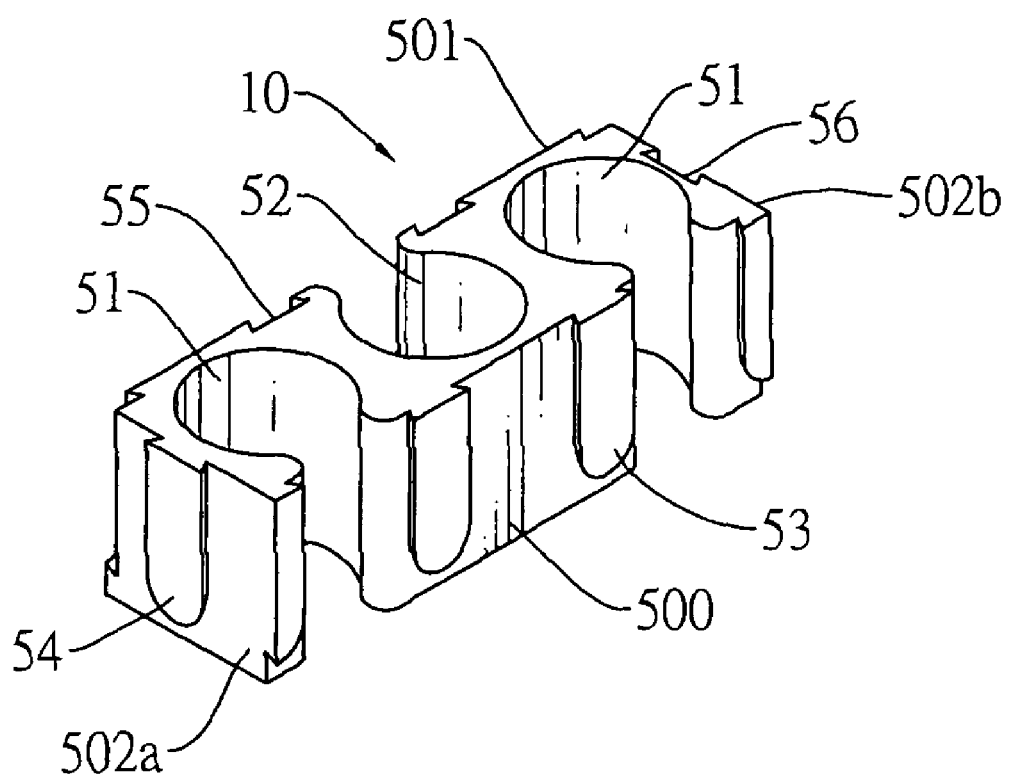
FIG. 2A is a rear perspective view of a first embodiment of a cable clamp in accordance with the present invention with three binding holes.
Figure 2B:
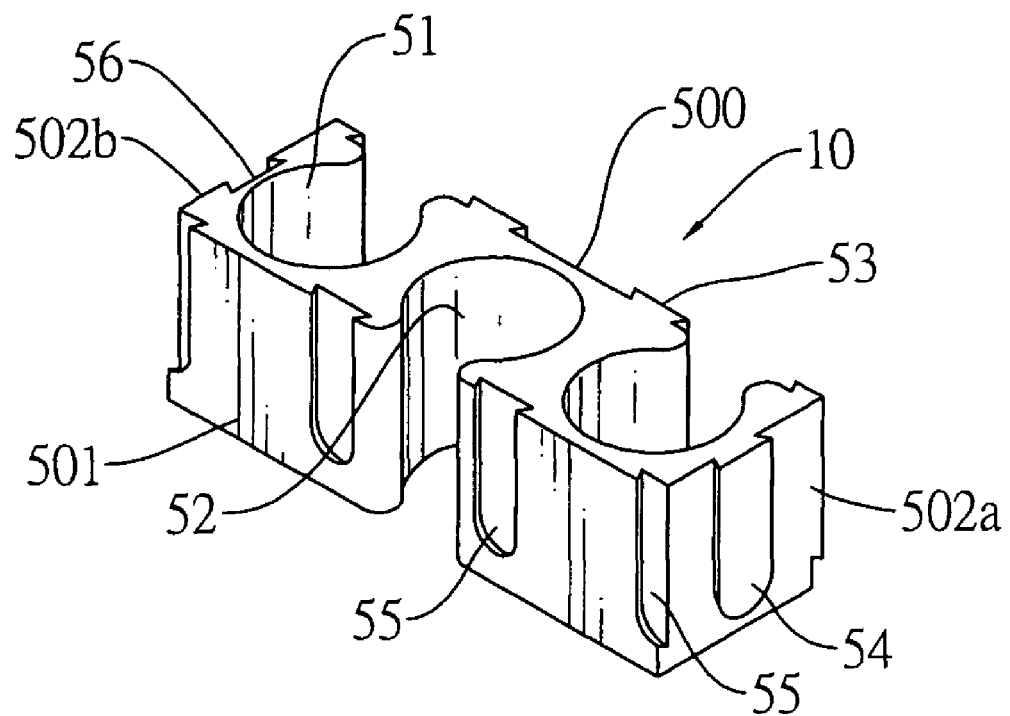
FIG. 2B is a front perspective view of the cable clamp in FIG. 2A.
Figure 3A:
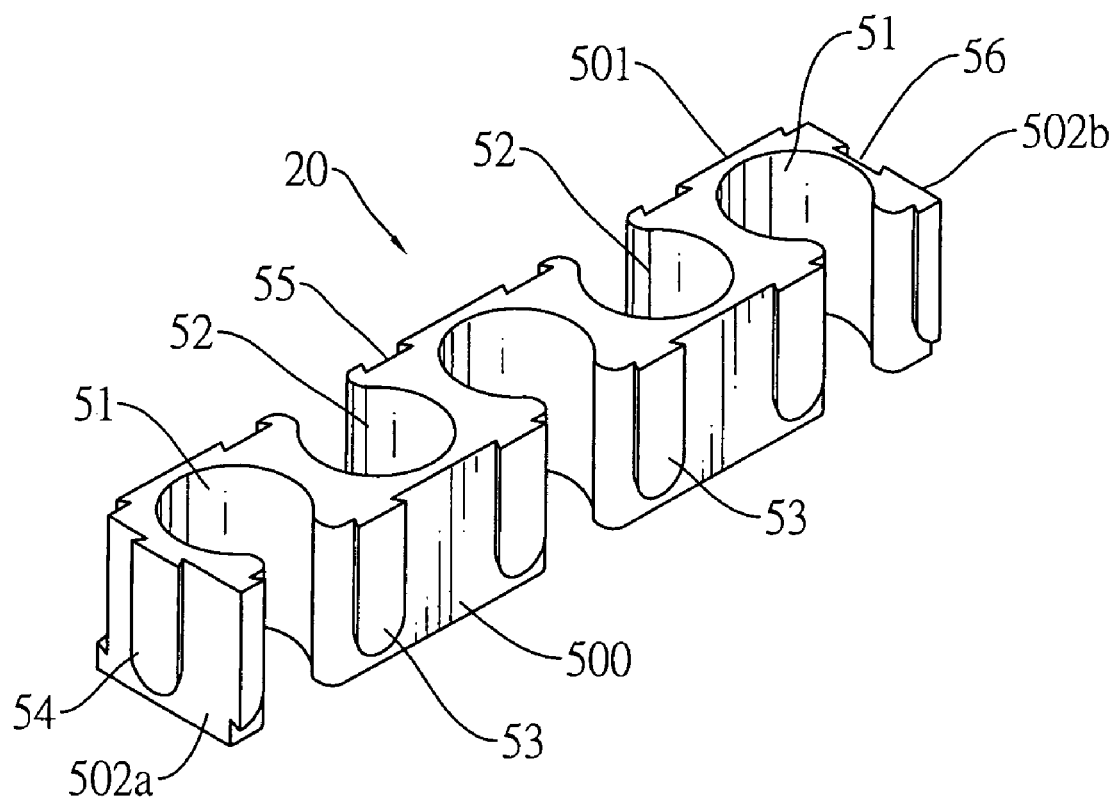
FIG. 3A is a rear perspective view of a second embodiment of a cable clamp in accordance with the present invention with five binding holes.
Figure 3B:
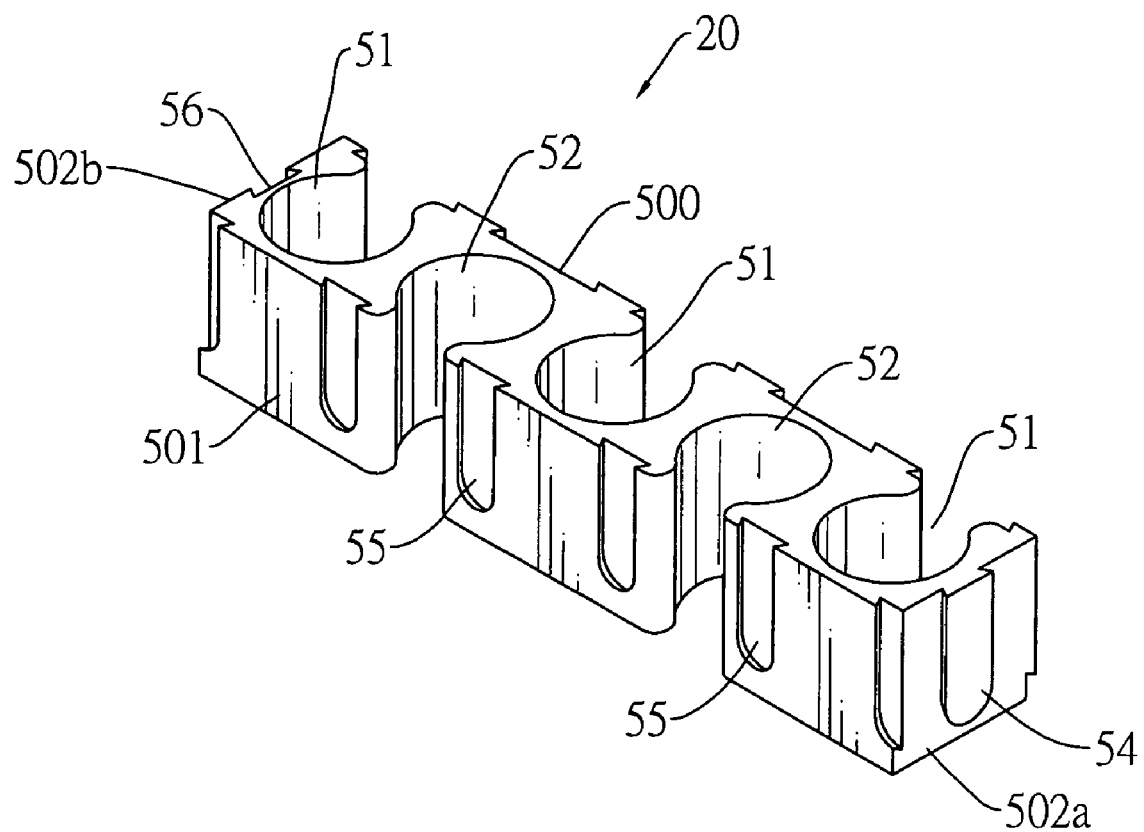
FIG. 3B is a front perspective view of the cable clamp in FIG. 3A.
Figure 4A:
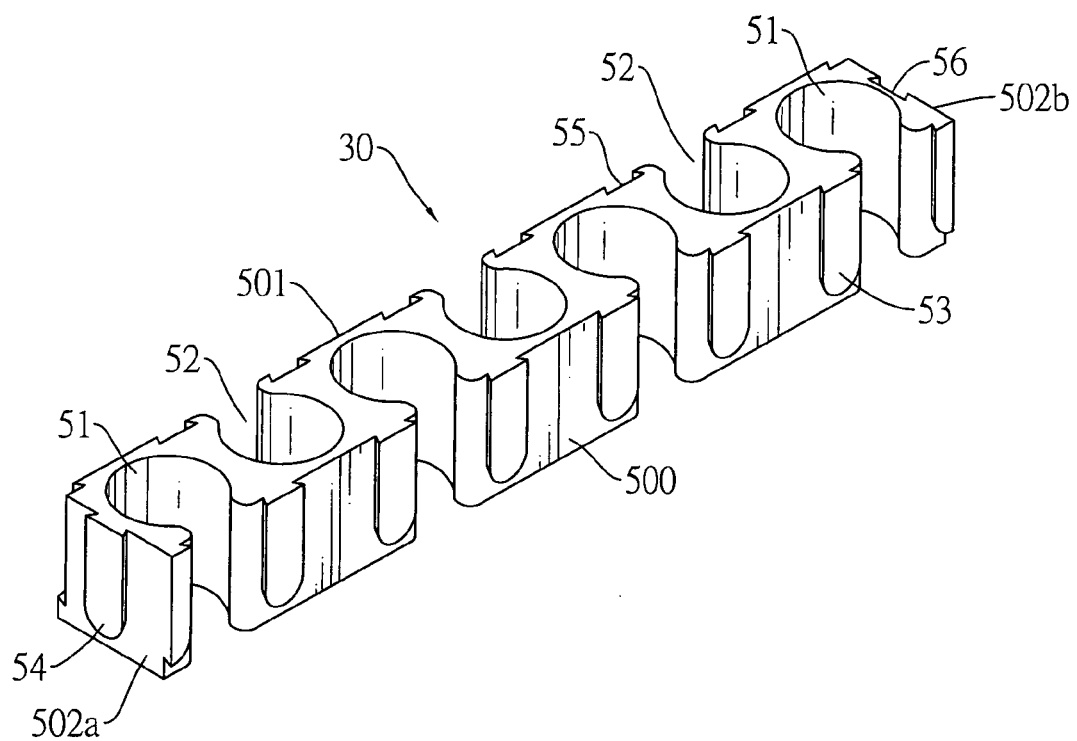
FIG. 4A is a rear perspective view of a third embodiment of a cable clamp in accordance with the present invention with seven binding holes.
Figure 4B:
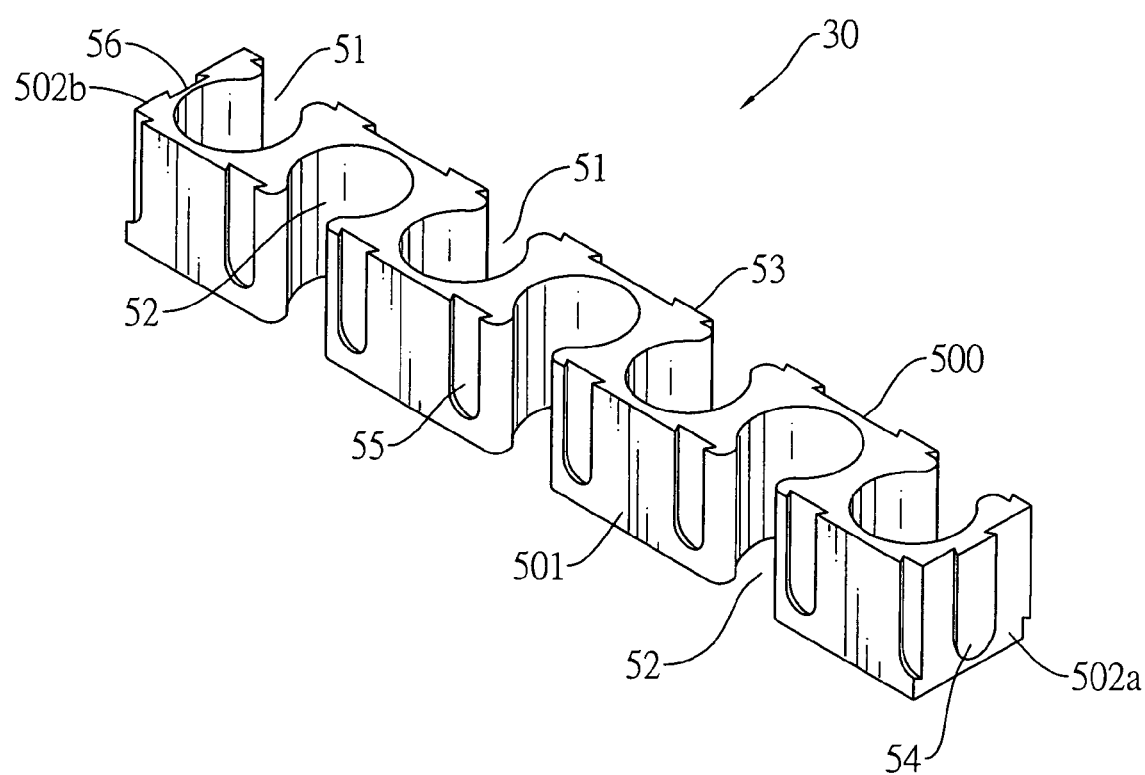
FIG. 4B is a front perspective view of the cable clamp in FIG. 4A.
Figure 5A:
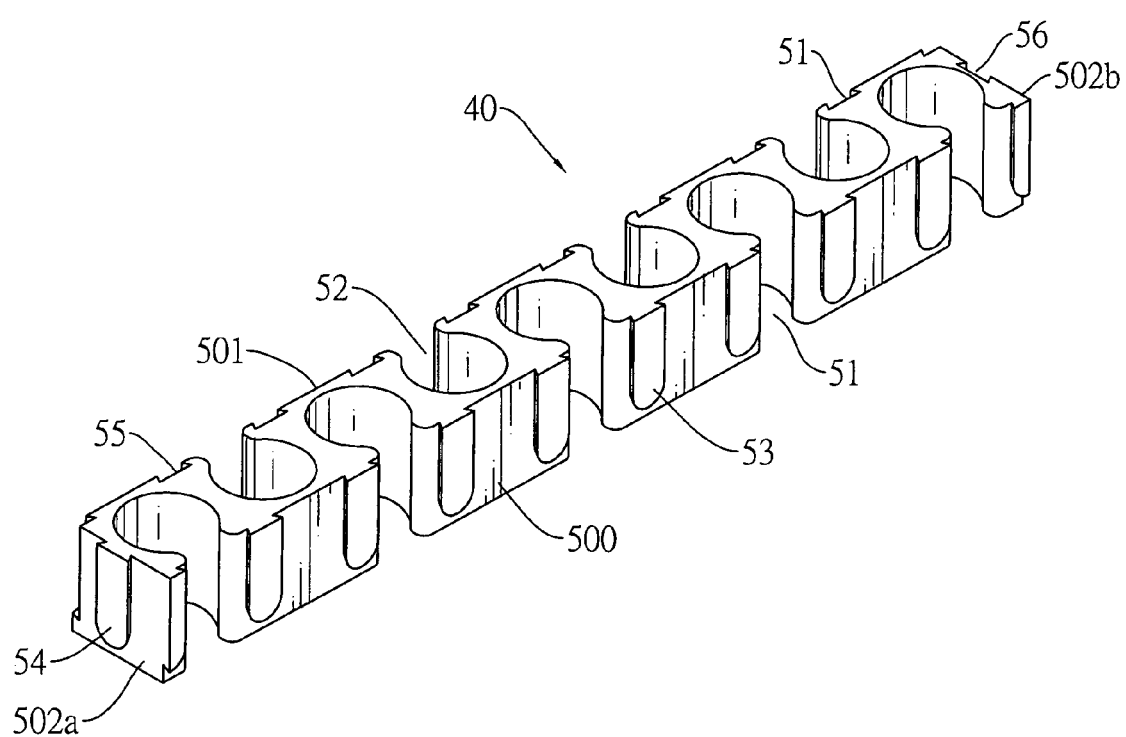
FIG. 5A is a rear perspective view of a fourth embodiment of a cable clamp in accordance with the present invention with nine binding holes.
Figure 5B:
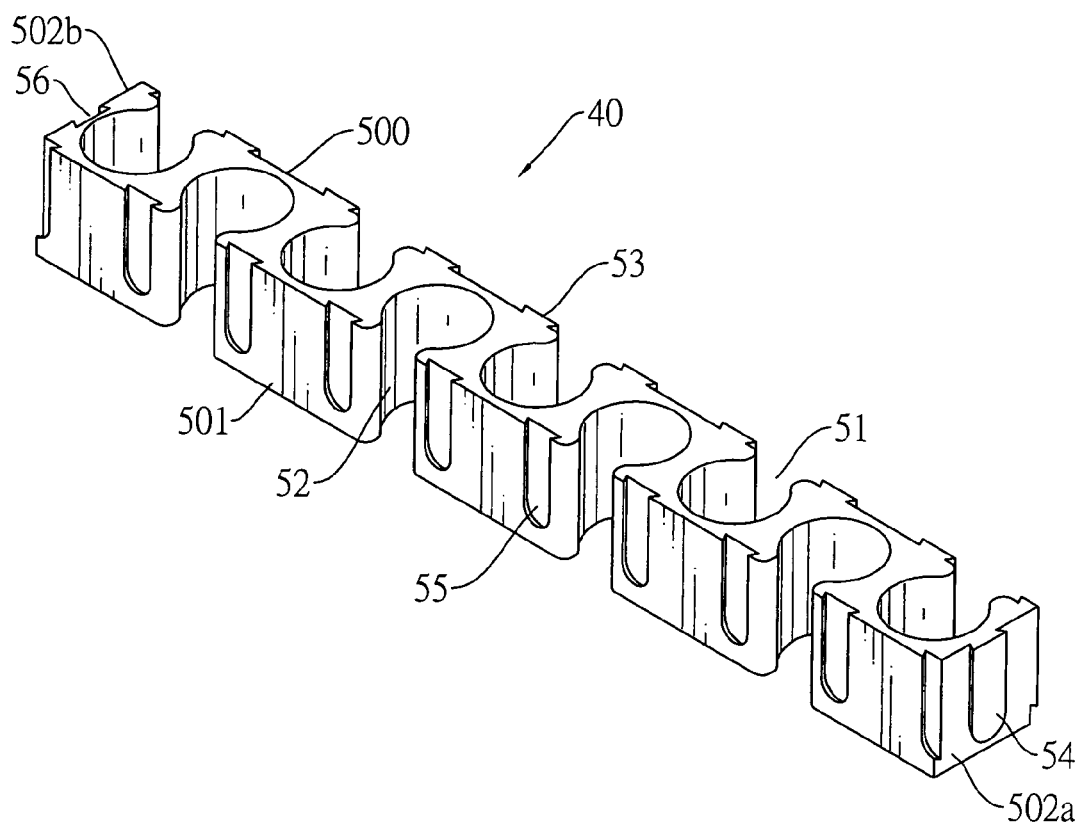
FIG. 5B is a front perspective view of the cable clamp in FIG. 5A.

With reference to FIGS. 2A, 2B, 3A, 3B, 4A, 4B, 5A and 5B, a cable clamp in accordance with the present invention is capable of attaching to another cable clamp in an array and comprises a body (10, 20, 30, 40), at least one front binding hole (52), at least one rear binding hole (51), multiple front connecting elements (55), multiple rear connecting elements (53), a first lateral connecting element (54) and a second lateral connecting element (56).

The body (10, 20, 30, 40) has a top, a bottom, a front surface (501), a rear surface (500), a first lateral surface (502a) and a second lateral surface (502b). The first lateral surface (502a) is opposite to the second lateral surface (502b).

Each front binding hole (52) penetrates the top and the bottom of the body (10, 20, 30, 40) and has a front opening formed on the front surface (501) to allow at least one cable entering the front binding hole (52).

The rear binding hole (51) penetrates the top and the bottom of the body (10, 20, 30, 40) and has a rear opening formed on the rear surface (500) to allow at least one cable entering the rear binding hole (51).

Furthermore, an amount of the front and the rear binding holes (52, 51) may be but is not limited to odd numbers, such as three, five, seven or nine, based on requirement. Moreover, the front and the rear binding holes (52, 51) are formed in a line alternatively on the body (10, 20, 30, 40) and between the first and the second lateral surfaces (502a, 502b).

The front connecting elements (55) are formed on the front surface (501) of the body (10, 20, 30, 40), and each front connecting element (55) may be a first dovetailed mortise. Furthermore, the front connecting elements (55) may be formed in a line on the front surface (501) of the body (10, 20, 30, 40) and between the first and the second lateral surfaces (502a, 502b).

The rear connecting elements (53) are formed on the rear surface (500) of the body (10, 20, 30, 40) and correspond respectively to the front connecting elements (55). Furthermore, each rear connecting element (53) may be a first dovetailed tenon corresponding to the first dovetailed mortise. Furthermore, the rear connecting elements (53) may be formed in a line on the rear surface (500) of the body (10, 20, 30, 40) and between the first and the second lateral surfaces (502a, 502b).

The first lateral connecting element (54) is formed on the first lateral surface (502a) and may be a second dovetailed tenon.

The second lateral connecting element (56) is formed on the second lateral surface (502b) and corresponds to the first lateral connecting element (54). Furthermore, the second lateral connecting element (56) may be a second dovetailed mortise corresponding to the second dovetailed tenon.

With further reference to FIG. 1, based on the foregoing descriptions, each cable clamp of the present invention is capable of attaching to another cable clamp of the present rather with connecting the front connecting element (55) of the cable clamp to the rear connecting element (53) of another cable clamp or with connecting the second lateral connecting element (56) of the cable clamp to the first lateral connecting element (54) of another cable clamp. Therefore, multiple cable clamps connecting together become a cable clamp assembly that has extendable binding holes (52, 51) to bind a large number of cables into a bundle of cables based on requirement. The large number of cables will not intertwist with each other when binding into a bundle. Furthermore, the front and the rear binding holes (52, 51) are alternatively formed respectively on the front and the rear surfaces (501, 500) of the body (10, 20, 30, 40) rather than formed on the same surface of the body (10, 20, 30, 40). When the cables are bound by the front and the rear binding holes (52, 51), the front and the rear surfaces (501, 500) of the body (10, 20, 30, 40) will averagely take stresses from the cables to the body (10, 20, 30, 40). Therefore, the body (10, 20, 30, 40) stays its original appearance without being bent by the stresses from the cables.

Figure 6:
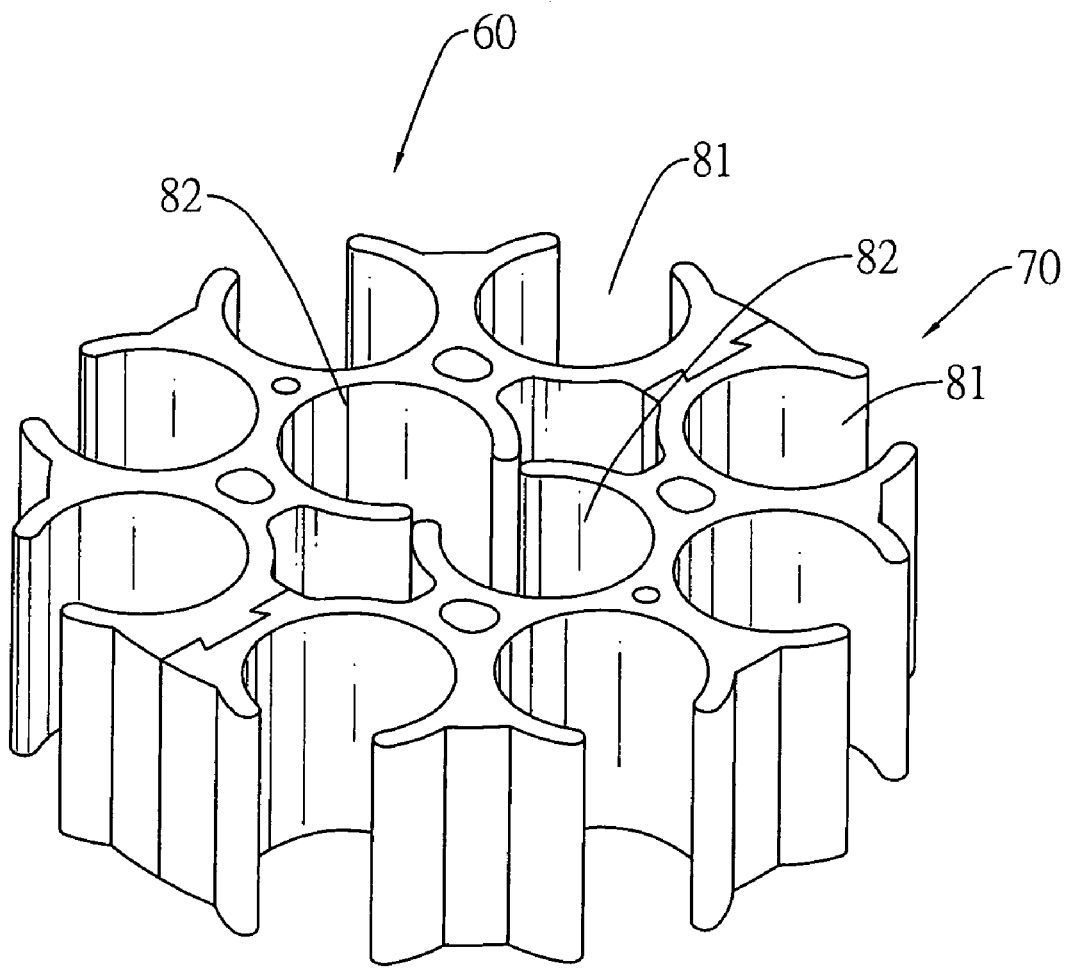
FIG. 6 is a perspective view of a second embodiment of a cable clamp assembly in accordance with the present invention.
Figure 7:
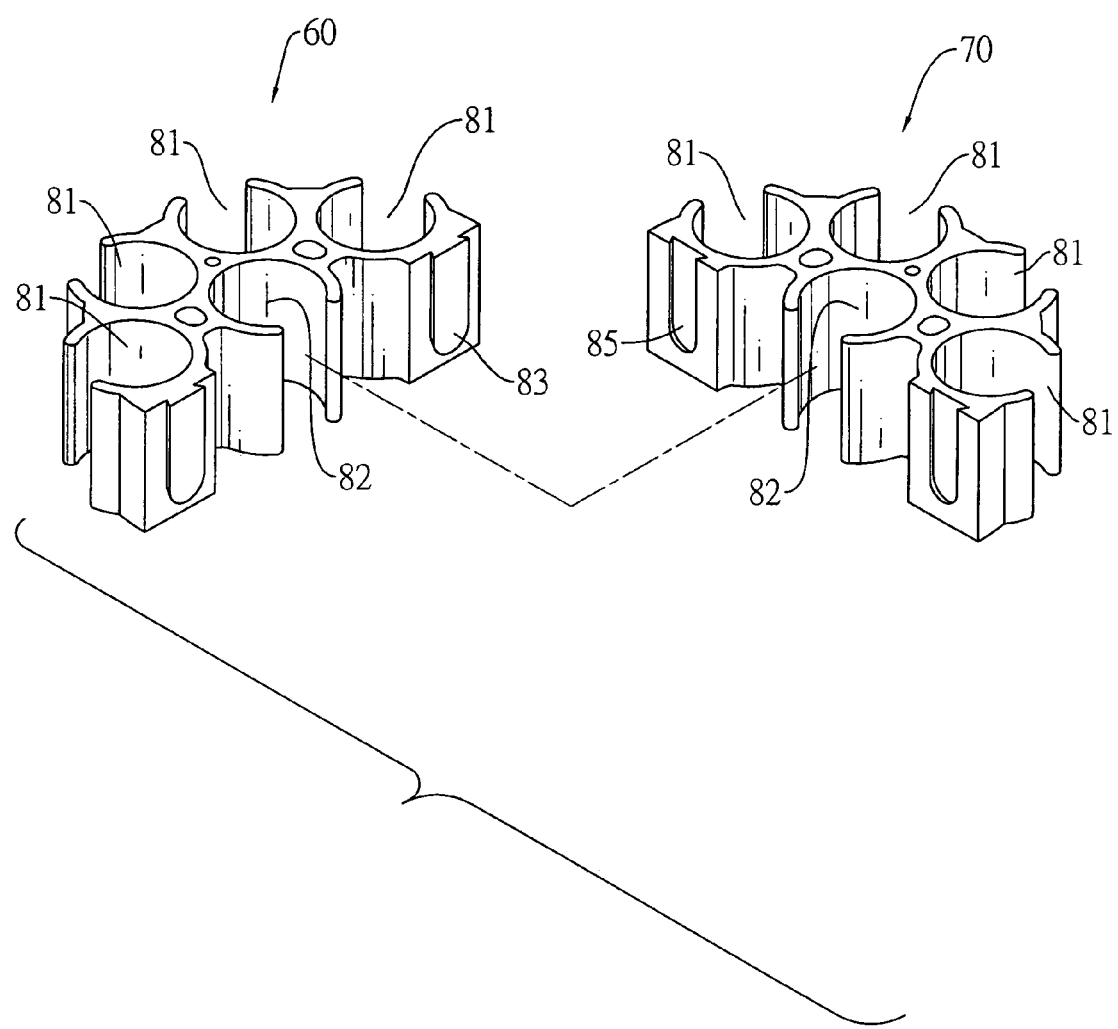
FIG. 7 is an exploded perspective view of the cable clamp assembly in FIG. 6.

With further reference to FIGS. 6 and 7, a cable clamp assembly in accordance with the present invention comprises a first cable clamp (60) and a second cable clamp (70).

The first cable clamp (60) is semicircular and has an inner surface, an arc outer surface, at least one inner binding hole (82), multiple outer binding holes (81) and multiple first connecting elements (83). Each inner binding hole (82) penetrates the first cable clamp (60) and has an inner opening formed on the inner surface of the first cable clamp (60) to allow at least one cable entering the inner binding hole (82). Each outer binding hole (81) penetrates the first cable clamp (60) and has an outer opening formed on the outer surface of the first cable clamp (60) to allow at least one cable entering the outer binding hole (81). The first connecting elements (83) are formed on the inner surface of the first cable clamp (60), and each first connecting element (83) may further be a third dovetailed tenon.

The second cable clamp (70) is semicircular and has an inner surface, an arc outer surface, at least one inner binding hole (82), multiple outer binding holes (81) and multiple first connecting elements (83). Each inner binding hole (82) penetrates the second cable clamp (70) and has an inner opening formed on the inner surface of the second cable clamp (70) to allow at least one cable entering the inner binding hole (82). Each outer binding hole (81) penetrates the second cable clamp (70) and has an outer opening formed on the outer surface of the second cable clamp (70) to allow at least one cable entering the outer binding hole (81). The second connecting elements (85) are formed on the inner surface of the second cable clamp (70), correspond and detachably connect respectively to the first connecting elements (83) on the first cable clamp (60). Furthermore, and each second connecting element (85) may be a third dovetailed mortise corresponding to the third dovetailed tenon on the first cable clamp (60).

Based on the foregoing descriptions, rather the first cable clamp (60) or the second cable clamp (70) of the cable clamp assembly of the present invention is cable of binding cables into a bundle independently. Furthermore, when the first cable clamp (60) is connected to the second cable clamp (70) of the second embodiment of the present invention, the cable clamp of the cable clamp assembly of the present invention is circular and is cable of binding double numbers of cables into a bundle than rather the first cable clamp (60) or the second cable clamp (70) of the second embodiment of the present invention is.

Figure 8:
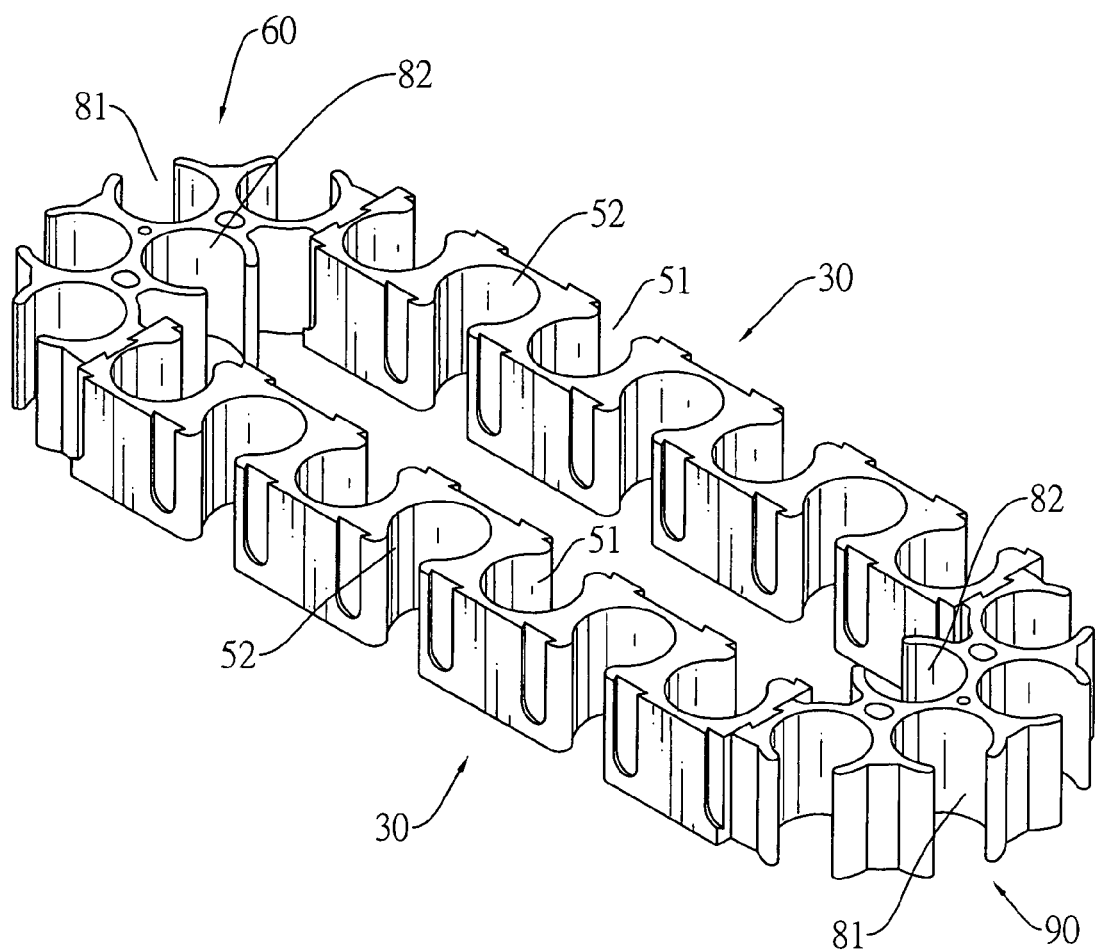
FIG. 8 is a perspective view of a third embodiment of a cable clamp assembly in accordance with the present invention.

With further reference to FIG. 8, a third embodiment of a cable clamp assembly of the present invention are combined with the cable clamps of the first and the second embodiments of the present invention. For example, multiple bodies (30) with three front binding holes (52) and four rear binding holes (51) are parallel, and the first connecting elements (83) of the first cable clamp (60) are connected to the second lateral connecting elements (56) of the body (30), and the second connecting elements (83) of the second cable clamp (70) are connected to the first lateral connecting element (54) of the body (30). Therefore, the connected cable clamps and cable clamp assembly become a capsule-shaped and annular cable clamp set to bundle more cables.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A cable clamp comprising:
 a body having a top, a bottom, a front surface, a rear surface, a first lateral surface and a second lateral surface being opposite to the first lateral surface;
 at least one front binding hole penetrating the top and the bottom of the body and having a front opening formed on the front surface to allow at least one cable entering the front binding hole;

at least one rear binding hole penetrating the top and the bottom of the body and having a rear opening formed on the rear surface to allow at least one cable entering the rear binding hole;

multiple front connecting elements formed on the front surface of the body;

multiple rear connecting elements formed on the rear surface of the body and corresponding respectively to the front connecting elements;

a first lateral connecting element formed on the first lateral surface; and a second lateral connecting element formed on the second lateral surface and corresponding to the first lateral connecting element.

2. The cable clamp as claimed in claim 1, wherein the front and the rear binding holes are formed in a line alternatively on the body and between the first and the second lateral surfaces.

3. The cable clamp as claimed in claim 2, wherein an amount of the front and the rear binding holes is odd.

4. The cable clamp as claimed in claim 3, wherein:
the front connecting elements are formed in a line on the front surface of the body and between the first and the second lateral surfaces; and
the rear connecting elements are formed in a line on the rear surface of the body and between the first and the second lateral surfaces.

5. The cable clamp as claimed in claim 4, wherein:
each front connecting element is a first dovetailed mortise; and
each rear connecting element is a first dovetailed tenon corresponding to the first dovetailed mortise.

6. The cable clamp as claimed in claim 5, wherein:
the first lateral connecting element is a second dovetailed tenon; and
the second lateral connecting element is a second dovetailed mortise corresponding to the second dovetailed tenon.

7. A cable clamp assembly comprising:
a first cable clamp being semicircular and having
an inner surface;
an arc outer surface;
at least one inner binding hole, and each inner binding hole penetrating the first cable clamp and having an inner opening formed on the inner surface of the first cable clamp to allow at least one cable entering the inner binding hole;
multiple outer binding holes, and each outer binding hole penetrating the first cable clamp and having an outer opening formed on the outer surface of the first cable clamp to allow at least one cable entering the outer binding hole; and
multiple first connecting elements formed on the inner surface of the first cable clamp; and
a second cable clamp being semicircular and having
an inner surface;
an arc outer surface;
at least one inner binding hole, and each inner binding hole penetrating the second cable clamp and having an inner opening formed on the inner surface of the second cable clamp to allow at least one cable entering the inner binding hole;
multiple outer binding holes, and each outer binding hole penetrating the second cable clamp and having an outer opening formed on the outer surface of the second cable clamp to allow at least one cable entering the outer binding hole; and
multiple second connecting elements formed on the inner surface of the second cable clamp, corresponding and detachably connecting respectively to the first connecting elements on the first cable clamp.

8. The cable clamp assembly as claimed in claim 7, wherein:
each first connecting element is a third dovetailed tenon; and
each second connecting element is a third dovetailed mortise corresponding to the third dovetailed tenon on the first cable clamp.

* * * * *